B. G. WAGGNER.
GAS METER.
APPLICATION FILED SEPT. 19, 1914.

1,177,552.

Patented Mar. 28, 1916.
2 SHEETS—SHEET 2.

WITNESSES:

INVENTOR
Benjamin G. Waggner

UNITED STATES PATENT OFFICE.

BENJAMIN G. WAGGNER, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

GAS-METER.

1,177,552.          Specification of Letters Patent.      Patented Mar. 28, 1916.

Application filed September 19, 1914. Serial No. 862,443.

*To all whom it may concern:*

Be it known that I, BENJAMIN G. WAGGNER, a citizen of the United States, residing at Philadelphia, in the county of Philadelphia and State of Pennsylvania, have invented certain new and useful Improvements in Gas-Meters, of which the following is a specification.

Changes and differences in temperature and other unavoidable conditions sometimes cause the pressure at the outlets of gas meters to exceed the pressure at the inlets and when this occurs the tangent-arm of the meter tends to turn backward, but for reasons well known to those skilled in the art the tangent-arm is prevented from turning backward by a tangent-stop or click, so that the joints between the flag-rods and flag-arms or some of them and also other parts of the meter mechanism are subjected to strains which they are unable to withstand and the result is that the meter "won't pass gas" or is otherwise put out of commission.

The object of the present invention is to avoid the above mentioned defects and disadvantages and to guard or protect meters from injury and accidents and to insure their continuous and successful operation. These and other objects hereinafter specified are accomplished in accordance with the present invention by affording the tangent-arm, or more accurately the tangent-arm operating mechanism, a limited range of retrograde movement or backward turning sufficient to relieve undue pressure at the outlet of the meter but insufficient to permit of any substantial operation of the meter even if its connections should be reversed with the wrongful intention of running the meter backward.

The invention will be claimed at the end hereof but will be first described in connection with the embodiment chosen from other embodiments of it for the sake of illustration in the accompanying drawings in which—

Figure 1:
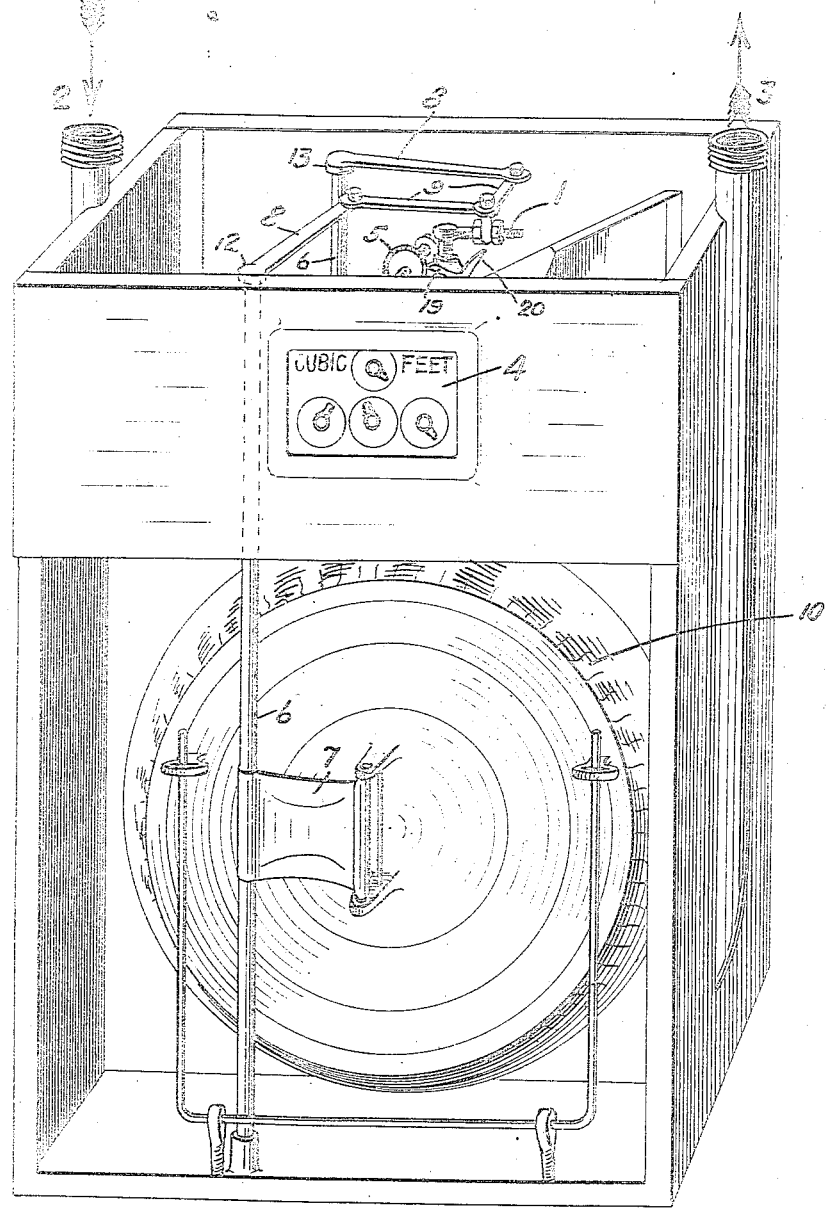
Figure 2:
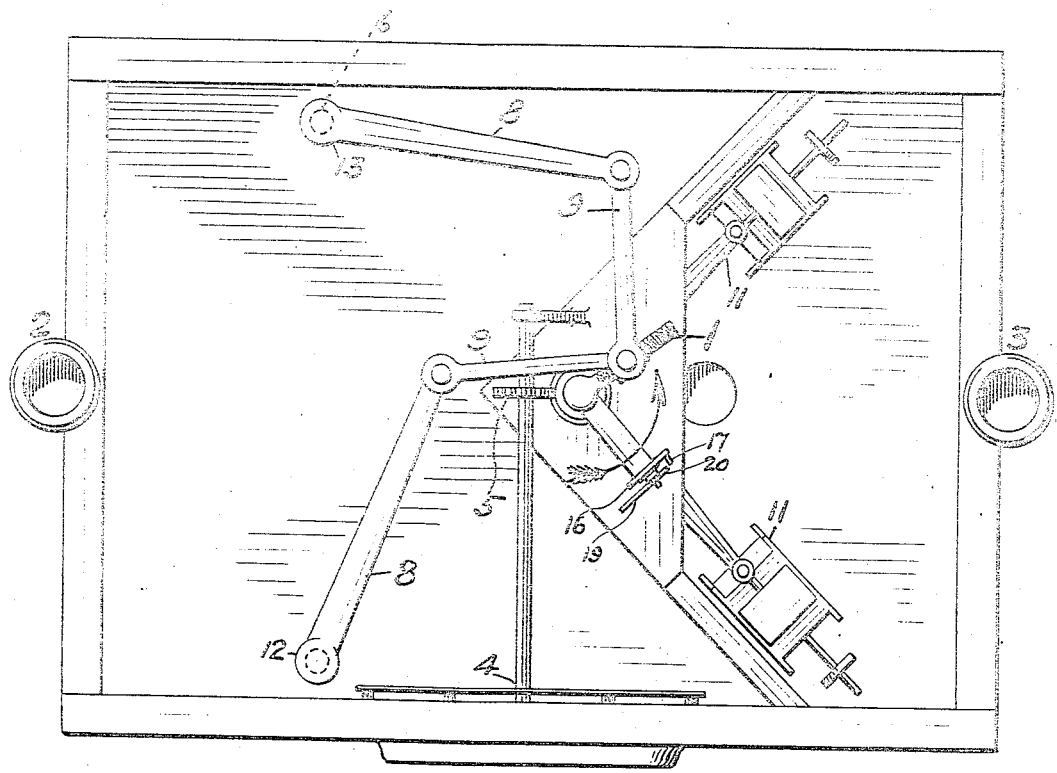
Figure 3:
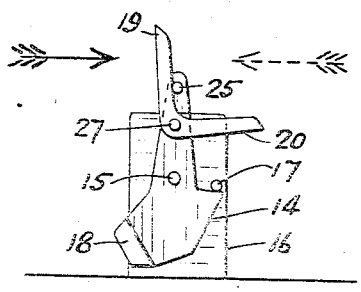
Figure 4:
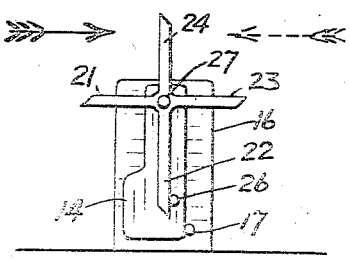

Figure 1, is a perspective view of a meter embodying features of the invention with parts of the meter removed. Fig. 2, is a top or plan view of Fig. 1. Fig. 3, is a front view of tangent-stop or click mechanism embodying features of the invention, and Fig. 4, is a similar view illustrating a modification.

In the drawings 1, is a tangent-arm.

2, is the gas inlet and 3, is the gas outlet.

The revolution of the tangent-arm operates the dial mechanism 4, through the intervention of gearing 5.

For the sake of description certain parts of the actuating mechanism for the tangent-arm may be referred to.

6, is the flag-rod, 7, is the flag, and 8 and 9, are the long and short flag-arms. 10, is the bellows or diaphragm, and 11, is the valve gear. These parts are well understood and their normal operation is that gas entering at the inlet 2, shall pass under the control of the valve gear 11, both inside the bellows and outside of the same leaving at the outlet 3, and causing in its passage the rotation of the tangent-arm and the measurement of the gas. The tangent-arm should rotate in appropriate direction for registering the amount of gas that has passed through the meter. Experience has shown that dishonest persons by from time to time reversing the direction of flow of gas through the meter have sought to subtract from the correct registration of gas actually consumed. To avoid this, meters have been provided with tangent click or stop mechanism which allows the tangent-arm to turn only in one direction, for example, counter-clockwise as shown by the arrow in Fig. 2. In use the pressure of gas on the inlet 2, is normally greater than the pressure of gas on the outlet 3, and when this is the case the tangent-arm turns in its appropriate direction uninterfered with by the tangent-stop or click which is operative only in case some one should wrongfully reverse the connections of the meter intending to run it backward and so reduce or subtract from the registry theretofore made. It sometimes happens, for example and merely by way of illustration, that when the gas has been turned off at the inlet side of the meter either to close a house or by a pre-payment meter, the pressure in the house pipes increases by an increase of temperature so that when the gas is again turned on the meter tends to run backward but its click or tangent-stop prevents it from running backward. The pressure of gas on the outlet is higher than on the inlet, under the conditions last mentioned, and subjects the parts of the meter to strains or stress. The result is that they frequently yield, for example at the points 12 and 13, and in such case the meter won't pass gas, or sometimes the diaphragms burst and in that case the meter will not measure gas. Contrasted with this and having regard to my invention, 14, is a click or stop bar pivoted as at 15, to a suitable support as 16, the form of which is not material.

17, is a fixed stop for the click or stop bar and it may be conveniently but not necessarily connected with the support 16. The click or stop-bar can swing about its pivot 15, away from its stop 17, but will normally return to rest in contact with its stop 17, for example by means of its weight or by means of a weight as 18, applied to it.

There is an armed click-or-stop-element movably connected with the click or stop-bar 14, and the arms of this element are disposed in range of the tangent arm 1. As shown in Fig. 3, the click-or-stop-element has two arms 19 and 20, shown as of equal length, and as shown in Fig. 4, the click-or-stop-element has four arms 21, 22, 23 and 24, of which the arm 22, is longer than the others.

Referring to Fig. 3, 25 is a stop between the click-or-stop-element and the bar 14, and it is shown as arranged between the arms 19 and 20. As shown in Fig. 4, 26, is a stop between the click-or-stop-element and the bar 14, and it is disposed in range of the arm 22, but clear of the other arms 21, 23 and 24. The ends of the various arms 19—24, are shown as beveled and these arms are disposed in range of the tangent-arm 1.

Referring to Fig. 3, when the meter is running in its normal direction its tangent-arm 1, is assumed to run counter-clockwise so that every time the tangent-arm passes the click mechanism it does so in the direction of the full line arrow. In passing the tangent-arm collides with the arm 19, which bearing upon the stop 25, and the pivot 27, by which it is connected with the bar 14, turns the latter about its pivot 15, away from the stop 17, so that the tangent-arm proceeds to rotate in its proper direction without interruption. Should the tangent arm be driven backward in the direction indicated by the dotted line in Fig. 3, for example, by reason of the pressure at the outlet 3, exceeding the pressure at the inlet 2, it will strike the arm 19, on the right hand side, referring to Fig. 3, and will turn that arm down away from the stop 25, and turn the other arm 20, up, leaving it in upright position. The next time that the tangent-arm comes around, it will strike the arm 20, on the righthand side thereof so that the arm 20, will bear on the stop 25, and the bar 14, will bear on the stop 17, and the tangent-arm will be thus arrested. Evidently the tangent-arm has made one backward revolution and is prevented from making any more backward revolutions, but one backward revolution is sufficient to have enabled enough gas to pass from the outlet to the inlet for relieving the high pressure on the outlet 3. Thereafter the tangent-arm may proceed in its normal direction indicated by the full arrow and at its first revolution it will strike the arm 20, and turn it back to the position shown in Fig. 3, and thereafter it will strike the arm 19 and cause it to turn the bar 14, in the manner above described.

The operation of the device shown in Fig. 4, is substantially the same as above described in connection with Fig. 3, except that the tangent-arm may make several back revolutions during which the short arms pass the stop 26, but the backward revolutions are stopped when the long arm 22, strikes the stop 26, as shown in Fig. 4. Provision is thus made for permitting the meter to run backward more than one revolution in cases where it is necessary in order to relieve the high pressure on the outlet side.

It will be obvious to those skilled in the art to which the invention relates that modifications may be made in details of construction and arrangement, hence the invention is not limited as to those matters or in any way further than the prior state of the art and the following claims may require.

I claim:

1. In a gas meter the combination of a revoluble tangent arm, a stop bar adapted when tipped by the forward passage of the tangent arm to position an element interconnected with it in the path of the tangent arm, and the element above referred to connected with the stop bar and normally in range of and tipped by the forward passage of the tangent arm and adapted to be oppositely tipped by retrograde passage of the tangent arm to position the stop bar for preventing further retrograde motion of the tangent arm.

2. In a gas meter the combination of a revoluble tangent-arm, and a click or stop provided with means for affording the arm a limited range of backward turning in excess of one revolution.

3. In a gas meter the combination of a tangent-arm and its actuating mechanism including a gas outlet, a movable click or stop bar, a fixed stop for said bar, and an armed click-or-stop-element movably connected with said bar and having its arms disposed in range of the tangent arm, and a stop between said element and bar, whereby the tangent-arm is afforded a limited range of backward turning sufficient to relieve undue pressure at the outlet and prevent damage and injury to the mechanism.

4. In a fluid meter, having registering mechanism and actuating mechanism therefor including a rotatable member, a dog, a pivotal support therefor, a stop for limiting the pivotal movement thereof in one direction, an arm on said dog normally disposed in the path of said rotatable member, at least one arm normally disposed out of the path thereof, and means for shifting the pivotal axis of said dog as said first-named arm thereof is moved by said member during reverse rotation of the latter whereby to throw and maintain another arm of the latter in the path of said member.

5. In a fluid meter, having a fluid pressure actuated rotatable member adapted to rotate in one direction as fluid passes through the said meter in one direction, means associated with said member for limiting reverse rotation thereof when the flow of fluid is reversed, said means comprising a pivoted stop member having a portion disposed normally in the path of said rotatable member, and a portion disposed normally out of the path thereof, the latter adapted to be thrown into said path as the former is moved out of the same during reverse rotation of said member under the influence of reverse flow of fluid through said meter, and a stop associated with said means for limiting the pivotal movement thereof in the last-named direction for preventing the last-named portion being moved by said rotatable member out of the path of the latter.

6. In a fluid meter, having a fluid pressure actuated rotatable member adapted to rotate in one direction as fluid passes through the said meter in one direction, means associated with said member for limiting reverse rotation thereof when the flow of fluid is reversed, said means comprising a pivoted dog, a stop for limiting the pivotal movement thereof in one direction, and a plurality of arms on said dog, one of said arms being normally disposed in the path of said rotatable member and the remainder thereof out of the path thereof, and means associated with said dog and said rotatable member for shifting the position thereof to thrown the several arms thereof successively into the path of said rotatable member as the latter is reversed, the last of said arms adapted to become disposed in the path of said rotatable member as said dog attains the aforesaid limit of its pivotal movement.

BENJAMIN G. WAGGNER.

Witnesses:
CLIFFORD K. CASSEL,
K. M. GILLIGAN.